United States Patent [19]

Hartmann et al.

[11] 3,917,405

[45] Nov. 4, 1975

[54] FLAME PHOTOMETRIC DETECTOR EMPLOYING PREMIXED HYDROGEN AND OXYGEN GASES FOR SAMPLE COMBUSTION WITH END-ON SPECTROPHOTOMETER VIEWING OF THE FLAME

[75] Inventors: Charles Harold Hartmann, Moraga; Richard Brandt DeLew, Corte Madera, both of Calif.

[73] Assignee: Varian Associates, Palo Alto, Calif.

[22] Filed: Mar. 8, 1972

[21] Appl. No.: 232,925

[52] U.S. Cl. ............................... 356/87; 356/187
[51] Int. Cl.² .......................................... G01J 3/30
[58] Field of Search ..................... 356/87, 187, 85

[56] References Cited
UNITED STATES PATENTS

| | | | |
|---|---|---|---|
| 2,836,097 | 5/1958 | Garman | 431/126 X |
| 2,990,749 | 7/1961 | Thiers | 431/126 |
| 3,489,498 | 1/1970 | Brody et al. | 356/187 |
| 3,580,680 | 5/1971 | Crider | 356/187 X |
| 3,588,594 | 6/1971 | Yamamoto | 356/85 |

Primary Examiner—Alfred E. Smith
Assistant Examiner—F. L. Evans
Attorney, Agent, or Firm—Stanley Z. Cole; Gerald M. Fisher; John J. Morrissey

[57] ABSTRACT

A flame photometric detector including a burner assembly having a first passageway leading to the burner tip so that a mixture of the hydrogen fuel gas and the combustion supporting gas such as oxygen may be delivered via the passageway to the burner tip to produce a hydrogen rich reducing flame. The sample to be analyzed is delivered via a second passageway and directed by a sample guide to the peripheral region of the reducing flame where the sample is burned in a relatively low temperature, hydrogen rich region. The spectrophotometer is positioned above the flame and having it's optical axis substantially coaxial with the burner assembly for end-on viewing of the combustion chamber.

7 Claims, 3 Drawing Figures

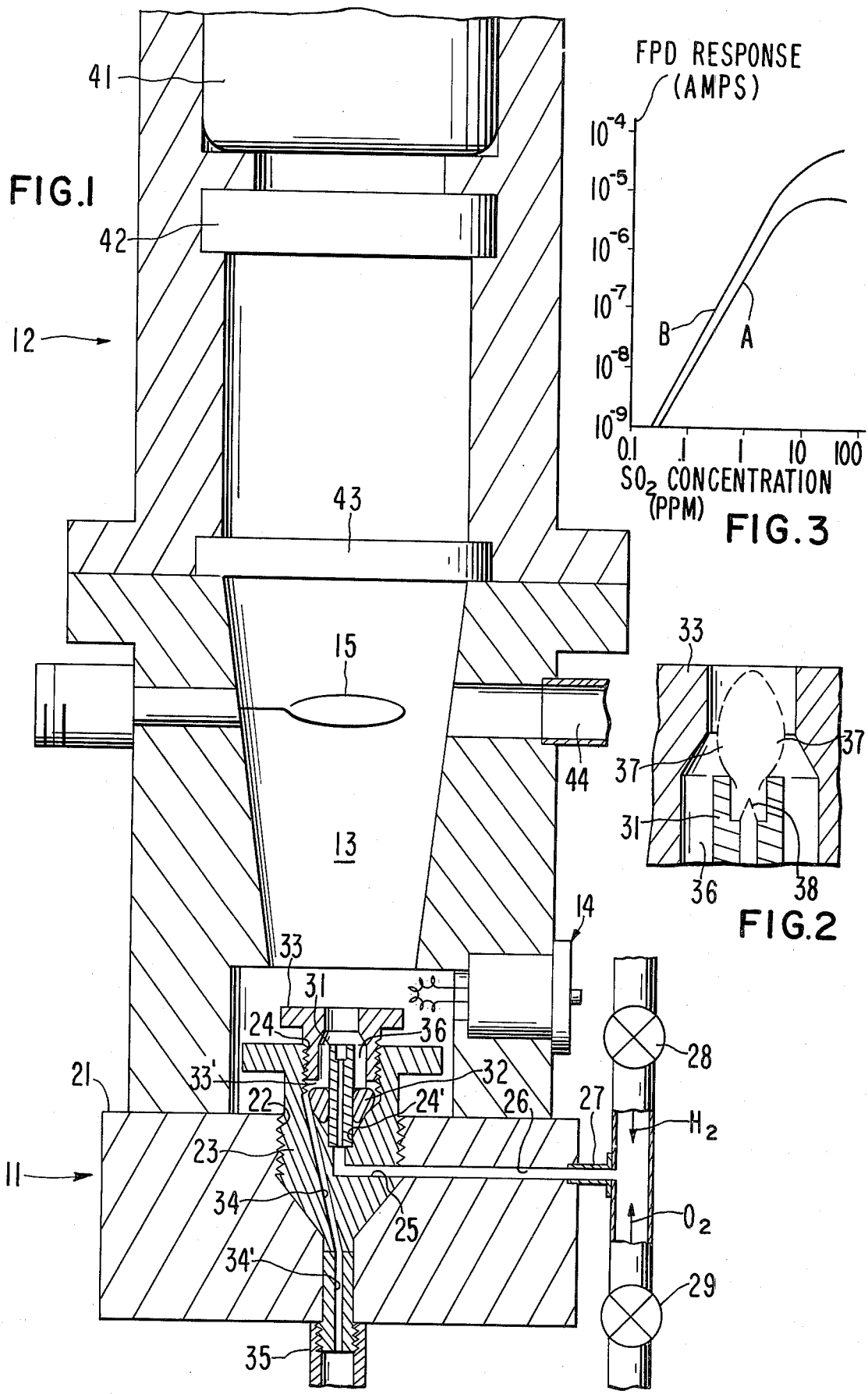

FLAME PHOTOMETRIC DETECTOR EMPLOYING PREMIXED HYDROGEN AND OXYGEN GASES FOR SAMPLE COMBUSTION WITH END-ON SPECTROPHOTOMETER VIEWING OF THE FLAME

BACKGROUND OF THE INVENTION

Flame photometric detectors are now in common use as relatively inexpensive spectroscopic detectors for use with gas chromatographs, including boron and halogens but particularly for the analysis of sulfur and phosphorus substances in the effluent from the gas chromatograph. As described in an article entitled "Gas Chromatographic Detectors" by C. H. Hartmann in Analytical Chemistry, Vol. 43, No. 2, pages 113A to 125A, February 1971, the basic elements of the flame photometric detector include a burner jet where the sample of effluent from the GC is burned in the combustion provided by $H_2$ fuel gas and a combustion supporting gas such as oxygen or air, and a spectrophotometer for observing the burned sample including a suitable light filter and photodetector. When substances containing sulfur are burned in the hydrogen rich flame, they emit characteristic light spectrum at about 360–410 nm; burning phosphorous-containing substances produce light emission at about 526 nm.

In the known form of such detectors as illustrated by the structures shown in U.S. Pat. No. 3,290,118 issued Dec. 6, 1966 to C. VanDerSmissen entitled "Apparatus For Detecting Phosphorus And/Or Sulfur in Gases" and U.S. Pat. No. 3,489,498 issued Jan. 13, 1970 to S. Brody et al. entitled "Flame Photometric Detector With Improved Specificity To Sulfur And Phosphorus", the sample under test, for example air or the column effluent from a gas chromotograph, is first mixed with the combustion supporting gas such as oxygen or air, and is then delivered to the burner tip through a first tube or passageway. The hydrogen is delivered to the combustion chamber via a separate passageway where it burns with the sample gas and oxygen and produces the desired combustion.

The flame produced by such a device may not be reliable in operation since, for example, it is subject to blowout resulting from a sudden surge of solvent in the effluent from the chromatograph or a resultant oxygen starvation. In addition, should the column output including the oxygen source be disconnected from the detector input, the flame is extinguished and the hydrogen may escape and create a safety hazard.

Further, the prior art sample and carrier gas mixture are fed into the very hot center portion of the hydrogen and oxygen flame and the burning of interfering substances such as organic compounds results in an interfering light emission, reducing the specificity of the detector, i.e., the ability to respond primarily to a select group or groups of substances with a minimal response to all other interference substances.

In the known forms of flame photometric detector the flame and combustion chamber are viewed from the side by the spectrophotometer, the optical axis of the spectrophotometer being positioned normal to the axis of the burner assembly. One reason for this arrangement is to avoid viewing the very hot burning region of the flame and the interfering emissions therein from the line-of-sight of the spectrophotometer. Special care is taken to block this interfering light; for example, in U.S. Pat. No. 3,489,498 a special form of cylindrical shield is provided about the tip of the burner so that the lower portion of the flame where such interference-producing burning normally takes place is reflected away from the optical line of sight of the photodetector positioned normal to the flame axis. However, shielding, reflecting or otherwise failing to view all of the emitted light in this fashion tends to reduce detector sensitivity, i.e., the effectiveness of the detector as a transducer in converting the sample into a measurable electrical signal, since it also blocks a portion of the desired emission.

SUMMARY OF THE PRESENT INVENTION

The present invention provides a novel flame photometric detector wherein the hydrogen fuel gas and the combustion supporting gas, e.g., oxygen, are premixed and then delivered to the burner tip via one passageway to produce the desired reducing flame at the tip. The sample is delivered to the peripheral region of the flame via a separate passageway such that burning of the sample occurs in the outer portion of the flame. As a result, the flame will not snuff out with surges of solvent through the sample conduit. In fact, the flame continues even when the gas chromatograph column is removed. Furthermore, as a consequence of this premixing there is no free flowing hydrogen to escape.

Since the sample is introduced into the peripheral region of the flame, it is burned in a cooler portion of the hydrogen-rich flame and this results in the substances of interest being burned at optimum conditions, including temperature and hydrogen concentration, while at the same time the interfering substances are being burned at non-optimum conditions for them. This results in production of interfering light emission. In addition, the spectrophotometer is positioned above the flame and the combustion region with the optical axis of the spectrophotometer parallel to and substantially aligned with the axis of the flame. Every effort is made to collect all portions of the emitted radiations and send them into the spectrophotometer. The specificity of the detector is not degraded by the increased response to the interfering light emissions because a lower amount and intensity of such interference is created by virtue of the cooler burning of the sample. Furthermore, the sensitivity of the detector is enhanced by the fact that a total view of the flame is obtained with all radiation being directed toward the optical detector.

DESCRIPTION OF THE DRAWINGS

FIG. 1 is a longitudinal cross sectional view of a preferred form of flame photometric detector structure of the present invention, FIG. 2 is an enlarged view of the tip region of the burner assembly region of FIG. 1, and FIG. 3 is a responsive curve for a prior art detector and the detector of the present invention.

DESCRIPTION OF THE PREFERRED EMBODIMENTS

Referring now to the drawings, the detector comprises a generally elongated shaped body structure including the burner means 11 mounted in one end thereof, the spectrophotometer structure 12 mounted in the opposite end thereof, and the combustion chamber 13 positioned therebetween. As with standard forms of flame photometric detectors, the structure is provided with a suitable igniter assembly 14 for initiating the flame and an ion collector means 15 for monitoring hydrocarbons within the chamber 13.

The burner assembly of this preferred embodiment comprises the structure shown and described in the U.S. patent application filed concurrently herewith by R. DeLew entitled "Flame Photometric Detector Employing Premixed Hydrogen and Oxygen Gases". The end-on viewing of the flame is shown and described in the U.S. patent application filed concurrently herewith by C. Hartmann entitled "Flame Photometric Detector with End-On Flame Viewing".

The burner means comprises a mounting base 21 having a threaded bore 22 therein and a cylindrical burner base 23 threaded into the bore in the mounting base. The burner base 23 is provided with an axial bore 24 therein, the bore being internally threaded at its top end and tapering down into a smaller diameter bore 24' near the lower end where it is provided with a flow passage bore 25. This bore 25 mates with a bore 26 leading out through the mounting base 21 to a T connection tubing 27, the two brances of the tubing being fed via control needle valves 28 and 29 from the sources of hydrogen and oxygen, respectively.

A burner tip assembly is mounted in the bore within the burner base 23 and comprises a hollow cylindrical flame tip member 31, a brass ferule 32, and a hollow cylindrical nut 33 forming a sample guide member. The hollow cylindrical flame tip member 31 is nested at one end into the lower end of the bore 24' in the burner base 23, the flame tip member being engaged by the annular ferule 32 which is urged downwardly against the outer wall of the flame tip member 31 and the inner wall of the burner base 23 by the hollow cylindrical sample guide 33 threaded into the bore in the burner base. A bore 34 extends through the burner base 23 from lower end thereof, this bore mating with a bore 34' in the base 21 where it connects with a conduit 35 serving as the sample input. The bore 34 leads into the annular chamber 36 formed between the inner wall of the sample guide 33 and the outer wall of the flame tip member 31. The sample guide 33 is provided with notches 33' in its threaded inner end to provide good ingress from the bore 34 to the annular chamber 36.

In operation, the hydrogen fuel gas and the combustion supporting gas, i.e., oxygen, are delivered via the needle valve controls 28 and 29 to the flow passage tubing 27 where they are mixed and then brought into the bore 26 in the mounting base, passing up through the central bore in the flame tip member 31 to the end of the tip member where the gases are ignited by a suitable flame igniter 14 to form the hydrogen-rich flame. The sample including the carrier from the chromatographic column is introduced through the bore 34 in the lower end of the ferrule 32 and into the chamber 36 surrounding the flame tip 31. The sample is then directed by the sample guide 33 into the peripheral region of the reducing flame, i.e., the lower temperature hydrogen-rich region. The temperature of this region is in the order of 400°C as distinguished from the temperature in the oxidation region of the flame of the order of 1700°C. While burning the substances of interest is optimized at this hydrogen-rich 400°C region to give good light emission therefrom, the undesired interference substances, such as hydrocarbons, are not burned efficiently. Thus, the interfering light emissions are maintained at a relatively low value.

The spectrophotometer unit 12 comprising the standard photomultiplier tube 41, light filter 42, and explosion shield 43 are positioned above and in substantially axial alignment with the axis of the burner assembly to give a full end-on viewing of the flame. This insures that all sides of the flame are viewed as well as the top. No portion of the flame or combustion region is intentionally obstructed or omitted from view even the high temperature inner region of the flame. Thus, the sensitivity of the detector is enhanced.

The combustion chamber 13 is in the form of an inverted cone such that the narrow end is at the burner. This minimizes the dead or unswept volume of the chamber so that previously burned combustion products do not remain in the chamber but are rapidly carried out the exhaust. This serves to enhance the operation of the detector by rapidly eliminating possible interfering substances from the combustion chamber.

Referring to FIG. 2 there is shown two curves representing the flame photometric detector response in amps for a standard known form of detector, curve A, and the detector employing the end view of the present invention, curve B, obtained with different steady-state levels of sulfur dioxide burned as the sample. Although the response is higher for the detector of the present invention, a higher noise level was also obtained so that the net detectivity of the two devices is about the same. While the prior art detector A exhibits a limit to dynamic range at about 20 ppm, the detector of the present invention has a dynamic range reaching at least to 50 ppm.

What is claimed is:

1. A flame photometric detector for the quantitative and qualitative detection of phosphorus and sulfur comprising a burner means including a combustion chamber extending in an axial direction a flame being produced, in operation, by the combustion of a mixture of a fuel gas and combustion supporting gas, said burner means including a flame tip, said burner means further including a first passageway and a second passageway, said first passageway to deliver said mixture of said fuel gas and said combustion supporting gas to said flame tip where combustion thereof forms a reducing flame and said second passageway being separated from said first passageway for delivering said sample to the cooler peripheral region of said reducing flame, and
   a photodetector means responsive to the photoemission of said phosphorus and said sulfur from said flame for qualitative and quantitative detection thereof, said photodetector means being mounted with its optical axis substantially parallel to the axis of said burner means to obtain an end-on sighting of said flame.

2. A flame photometric detector as claimed in claim 1 wherein said burner means includes a flame tip member forming said flame tip at one end thereof, said flame tip member having said first passageway therein leading to said flame tip end, said second passageway being formed externally of said flame tip member.

3. A flame photometric detector as claimed in claim 2 wherein said burner means comprises a sample guide member surrounding the flame tip region of said flame tip member and forming said second passageway for said sample to said peripheral region of said flame.

4. A flame photometric detector as claimed in claim 1 wherein said burner means and said photodetector means each have cylindrical rotational symmetry and are coaxially aligned.

5. A flame photometric detector as claimed in claim 1 wherein said burner means comprises a vertically directed tip means producing said flame at the upper end thereof, said photodetector means being mounted above said flame tip and in line-of-sight therewith.

6. A flame photometric detector as claimed in claim 5 wherein said burner means and said photodetector means each have rotational symmetry and are coaxially aligned.

7. A flame photometric detector as claimed in claim 1 wherein said burner means comprises a tip portion having a passageway therein for the transmission of said fuel and combustion supporting gases to the flame at the burning end of said tip portion, and a sample guide portion surrounding the burning end of said tip portion, said guide portion forming a passageway for delivering said sample to the peripheral region of said flame.

* * * * *